(12) United States Patent
Harbu

(10) Patent No.: US 7,168,535 B2
(45) Date of Patent: Jan. 30, 2007

(54) NON METALLIC GAS VALVE ASSEMBLY FOR A SHOCK ABSORBER

(75) Inventor: Julian Harbu, North York (CA)

(73) Assignee: ArvinMeritor Technology LLC, Troy, MI (US)

(*) Notice: Subject to any disclaimer, the term of this patent is extended or adjusted under 35 U.S.C. 154(b) by 563 days.

(21) Appl. No.: 10/293,833

(22) Filed: Nov. 13, 2002

(65) Prior Publication Data

US 2004/0089507 A1 May 13, 2004

(51) Int. Cl.
*F16F 9/43* (2006.01)

(52) U.S. Cl. .............................. 188/322.21; 267/64.28; 251/149; 138/31

(58) Field of Classification Search .............. 251/149; 138/31; 188/269, 297, 304, 322.13, 322.16, 188/322.19, 322.21; 267/64.28
See application file for complete search history.

(56) References Cited

U.S. PATENT DOCUMENTS

| | | | | |
|---|---|---|---|---|
| 3,100,498 A | * | 8/1963 | Gibson, Jr. | 473/611 |
| 4,568,081 A | * | 2/1986 | Martin | 473/611 |
| 5,344,125 A | * | 9/1994 | Cotter | 267/64.28 |
| 5,458,219 A | * | 10/1995 | Anderson | 188/322.21 |
| 5,915,407 A | * | 6/1999 | West | 137/223 |

* cited by examiner

*Primary Examiner*—Xuan Lan Nguyen
(74) *Attorney, Agent, or Firm*—Carlson, Gaskey & Olds

(57) ABSTRACT

A gas valve assembly for a shock absorber includes a first portion of a first material and a second portion of second material which is less rigid than the first material. The first portion defines a rigid valve assembly body having a threaded portion to mount the valve to the shock body. The second portion is resilient and defines an integral plug and annular seal interconnected by a connecting member. The annular seal is molded adjacent a step engagement surface to seal the gas valve assembly to the shock body. A head having a tool engagement surface compresses the annular seal when the gas valve assembly is threaded in place.

18 Claims, 3 Drawing Sheets

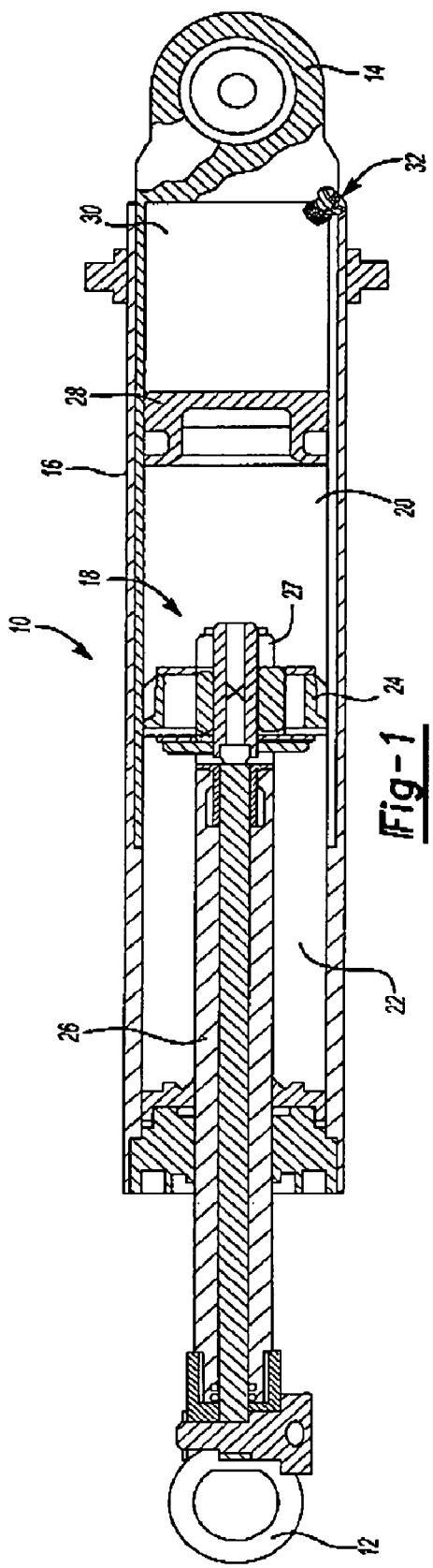
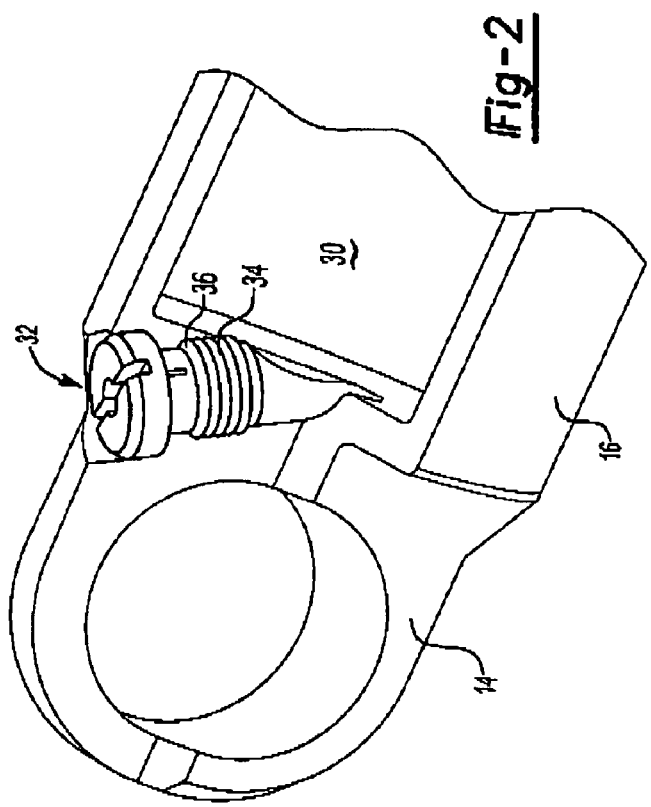

NON METALLIC GAS VALVE ASSEMBLY FOR A SHOCK ABSORBER

BACKGROUND OF THE INVENTION

The present invention relates to a shock absorber, and more particularly to a nonmetallic gas valve assembly therefor.

Shock absorbers are used in vehicles to dampen inputs from roadways. Conventional monotube shock absorbers include a body which defines a cavity filled with hydraulic fluid. A piston is disposed within the cavity and separates compression and rebound fluid chambers from one another. A rod is secured to the piston to transmit an input force to move the piston within the cavity. A floating piston is arranged in the cavity to separate the compression chamber from a gas chamber. The floating piston moves within the cavity to accommodate the additional volume of the piston rod during the compression and rebound strokes.

A relatively complex gas valve assembly provides for external communication to fill the gas chamber. Conventional gas valve assemblies include a metallic body, an o-ring seal and an internal rubber plug. The metallic body is threaded into the shock body and sealed thereto about the outer periphery through the O-ring. The gas chamber is charged through the gas valve with a needle that is inserted through the plug. The gas chamber is typically pressurized to above 200 psi. When the needle is removed the plug essentially self-seals.

Although effective, the gas valve assembly is a relatively expensive and complicated component. For some vehicle applications, such as snowmobile shock absorbers, such a gas valve may increase the unit cost of the shock absorber considerably.

Accordingly, it is desirable to provide an effective inexpensive monotube shock absorber valve assembly.

SUMMARY OF THE INVENTION

The gas valve assembly for a shock absorber according to the present invention provides communication with the gas chamber. The gas valve assembly is manufactured of a non-metallic material though a two shot molding process.

The gas valve assembly includes a first portion of a first material and a second portion of second material which is less rigid than the first material. The first portion defines a rigid valve assembly body having a threaded portion to mount the valve to the shock body. The second portion includes a plug and an annular seal interconnected by a connecting member.

A needle or like may be inserted through the plug to fill the gas chamber. The plug is self-sealing such that when the needle is removed the gas chamber is sealed. The annular seal is molded adjacent a step engagement surface to seal the gas valve assembly to the shock body. A head having a tool engagement surface compresses the annular seal when the gas valve assembly is threaded in place.

The present invention therefore provides an effective inexpensive monotube shock absorber valve assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general cross-sectional view of a monotube shock absorber;

FIG. 2 is an enlarged partial sectional view of the gas chamber of the shock absorber illustrating the valve assembly in a mounted position;

DETAILED DESCRIPTION OF THE PREFERRED EMBODIMENT

Figure 4:
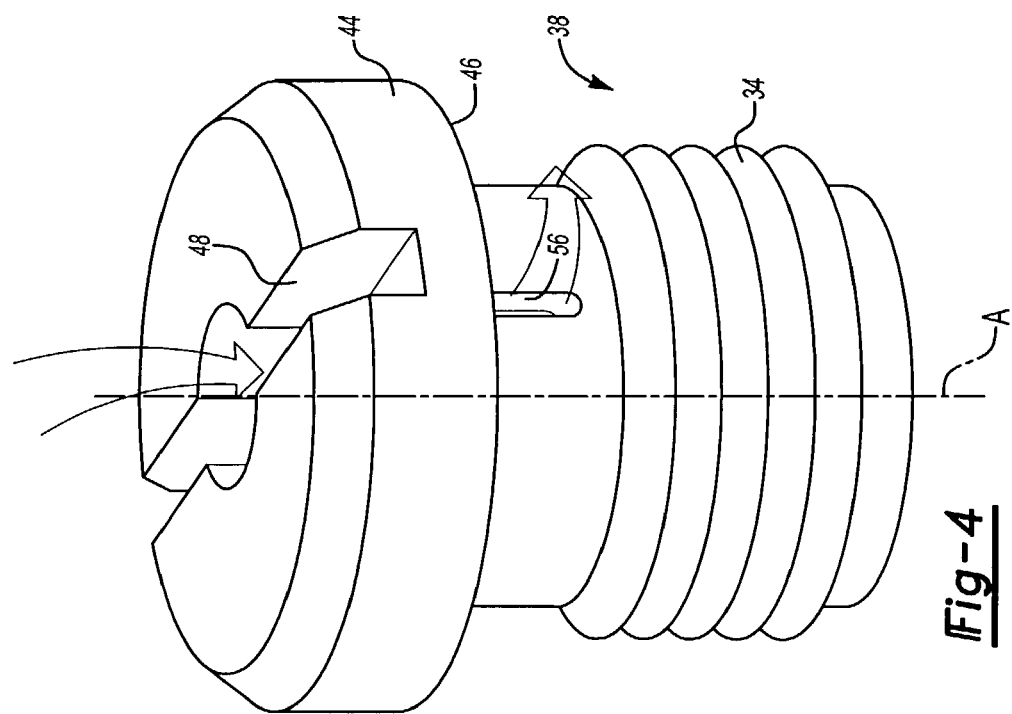
FIG. 4 is a perspective view of a first portion of the gas valve assembly of FIG. 3.

FIG. 1 illustrates a general perspective view of a monotube shock absorber 10. It should be understood that other shock absorbers and other device wholly unrelated to shock absorbers will benefit from the present invention.

The shock absorber 10 is connected between a suspension and a vehicle body by upper 12 and lower 14 ends. The absorber 10 includes a body 16 defining a cavity 18 that is filled with hydraulic fluid. A piston 24 is disposed within the cavity 18 and separates compression 20 and rebound 22 fluid chambers from one another. A rod 26 is secured to the piston 24 typically by a nut 27 to transmit the input received from the upper end 12 to the piston 24 to move the piston 24 within the cavity 18.

The piston 24 typically includes numerous valves and passages that controls the flow of fluid between the compression 20 and rebound 22 chambers to define the damping characteristics of the absorber 10 as the piston 24 moves longitudinally in the cavity 18. For some shock absorber applications, such as for snowmobiles, it maybe desirable to provide an adjustment assembly to permit the operator to adjust damping characteristics of the absorber 10.

A floating piston 28 is arranged in the cavity 18 to separate the compression chamber 20 from a gas chamber 30. The floating piston 28 moves within the cavity 18 to accommodate the additional volume of the rod 26 during the compression and rebound strokes. A gas valve assembly 32 provides communication with the gas chamber 30.

Referring to FIG. 2, the gas valve assembly 32 preferably provides communication with the gas chamber 30. The gas valve assembly 32 includes a threaded portion 34 which engage corresponding threads 36 on the shock body 16. The gas valve assembly 32 may therefore be removed and or replaced for maintenance or the like. The gas valve assembly 32 allows the gas chamber 30 to be filled with a gas such as nitrogen.

Figure 3:
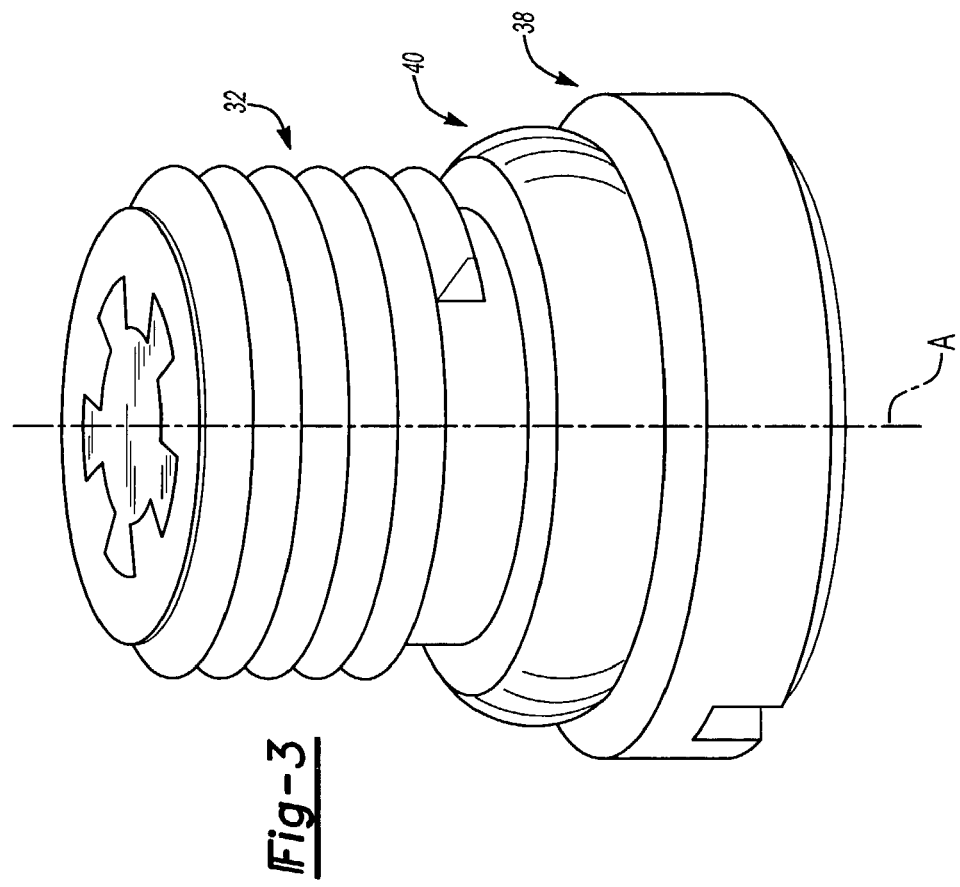
FIG. 3 is a perspective view of the gas valve assembly.

Referring to FIG. 3, the gas valve assembly 32 is preferably manufactured of a nonmetallic material. Most preferably, a two shot molding process is utilized to manufacture the gas valve assembly 32. The gas valve assembly 32 includes a first portion 38 of a first material and a second portion 40 of second material which is less rigid than the first material. Preferably, the first material is a plastic composition which the second material is a resilient rubber composition.

Referring to FIG. 4, the first portion 38 defines a rigid valve assembly body 42. The body 42 includes a head portion 44 and the threaded portion 34 defined along an axis A. The head portion 44 defines a diameter greater than the threaded portion 34 to provide a step engagement surface 46.

A slot 48 in the head portion 44 extend generally transverse axis A to provide an engagement surface for a tool such as a screw driver or the like. It should be understood that any engagement surface which receives a particular tool to thread and unthread the valve assembly 32 will benefit from the present invention.

Figure 5:
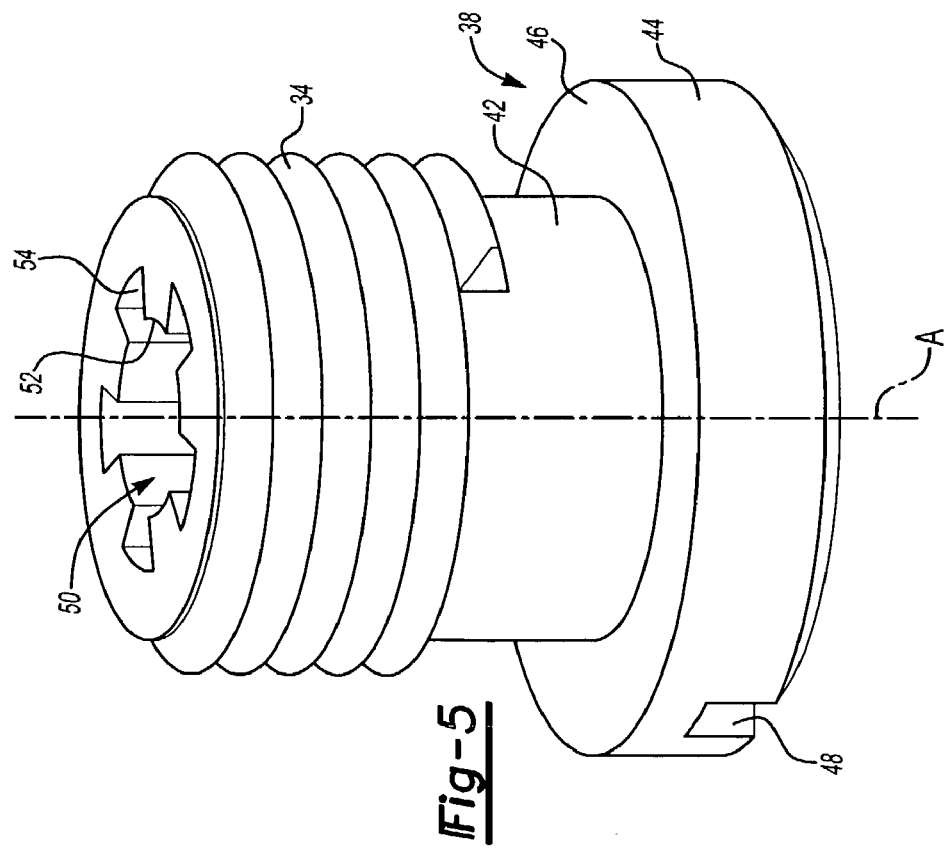
FIG. 5 is another perspective view of the first portion of FIG. 4.

The body 42 is generally tubular and includes an inner bore 50. The inner bore 50 passes through the length of the body 42 and preferably defines a plurality of lands 52 and grooves 54 (FIG. 5). The lands 52 and groves 54 are defined along axis A. A transverse passage 56 preferably passes through the body 42 adjacent the step engagement surface 46. That is, passage 56 provides a communication path between the bore 50 and the external surface of the body 42.

Figure 6:
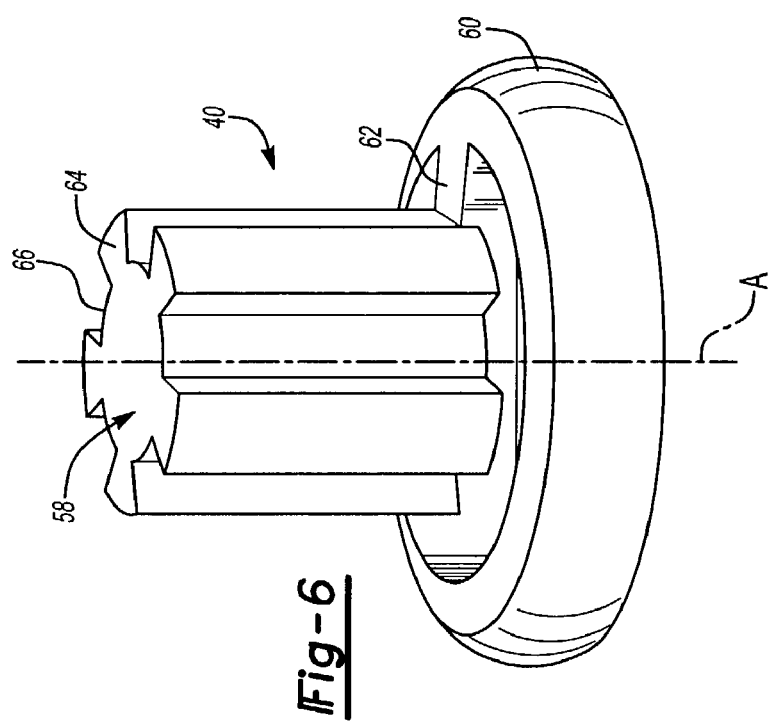
FIG. 6 is a perspective view of a second portion of the gas valve assembly of FIG. 3.

Referring to FIG. 6, the second portion 40 is illustrated independent of the first portion 38. The second portion 40 is the second shot of the preferred two shot molding process utilized to manufacture the gas valve assembly 32. The second portion 40 includes a plug 58 and an annular seal 60 interconnected by a connecting member 62 formed through the passage 56.

The plug 58 is defined along axis A and fills the plurality of lands 52 and grooves 54 (FIG. 4) with corresponding lands 64 and grooves 66. Preferably, the lands 64 are dovetail in shape to interlock the second portion 40 with the first portion 38. A needle or like maybe inserted through the plug 58 along axis A to fill the gas chamber 30 (FIGS. 1 and 2). The plug 58 is self-sealing such that when the needle is removed the gas chamber 30 is sealed.

The annular seal 60 is defined about axis A. The annular seal 60 is molded adjacent the step engagement surface 46 to seal the gas valve assembly 32 to the shock body 16 (FIG. 2). The head preferably compresses the annular seal 60 when the gas valve assembly 32 is threaded in place.

The connecting member 62 interconnects the plug 58 and the annular seal 60. That is, during the second shot material flows through the passage 56 to mold the second portion 40 as an integral member. It should be understood that other locations for the connecting member will benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A shock absorber assembly comprising:
   a shock absorber body comprising a gas chamber and a threaded opening;
   a first portion mounted within said threaded opening, said first portion formed of
      a first non-metallic material, said first portion defining an axis; and
   a second portion formed of a second non-metallic material less rigid than said first non-metallic material, said second portion comprising a plug and a seal interconnected by a connecting member.

2. The shock absorber assembly as recited in claim 1, wherein said plug is located along said axis and at least partially within a bore formed within said first portion.

3. The shock absorber assembly as recited in claim 2, wherein said bore defines a plurality of bore lands and bore grooves.

4. The shock absorber assembly as recited in claim 3, wherein said plug defines a plurality of plug lands and plug grooves corresponding with said bore lands and bore grooves.

5. The shock absorber assembly as recited in claim 4, wherein said plug lands and said plug grooves form a dove tail relationship with said bore lands and said bore grooves formed within said first portion.

6. The shock absorber assembly as recited in claim 1, wherein said seal comprises an annular member defined about said axis.

7. The shock absorber assembly as recited in claim 1, wherein said first portion comprises a head portion and a threaded section.

8. The shock absorber assembly as recited in claim 7, wherein said head portion comprises a tool engagement surface.

9. The shock absorber assembly as recited in claim 8, wherein said seal comprises an annular member defined about said axis adjacent said head portion.

10. The shock absorber assembly as recited in claim 1, wherein said first portion comprises a transverse passage between an outer surface and a bore.

11. The shock absorber assembly as recited in claim 1, wherein said seal comprises an annular member defined about an outer perimeter of said first portion.

12. The shock absorber assembly as recited in claim 1, wherein said plug defines a plurality of plug lands and plug grooves defined generally parallel to said axis.

13. The shock absorber assembly as recited in claim 1, wherein said connecting member passes through a transverse passage defined through said first portion.

14. A shock absorber assembly comprising:
   a shock absorber body;
   a first portion mounted within said shock absorber body, said first portion formed of a first non-metallic material; and
   a second portion formed of a second non-metallic material less rigid than said first non-metallic material, said second portion comprising a plug and a seal interconnected by a connecting member which passes through a transverse passage defined by said first portion.

15. The shock absorber assembly as recited in claim 14, wherein said transverse passage is generally transverse to an axis defined along said first portion.

16. The shock absorber assembly as recited in claim 14, wherein said plug defines a plurality of plug lands and plug grooves defined generally parallel to an axis defined along said first portion.

17. A shock absorber assembly comprising:
   a shock absorber body;
   a first portion mounted within said shock absorber body, said first portion formed of a first non-metallic material; and
   a second portion formed of a second non-metallic material less rigid than said first non-metallic material, said second portion comprising a plug and a seal interconnected by a connecting member which passes through a transverse passage defined through said first portion, said seal defined about an outer perimeter of said first portion.

18. The shock absorber assembly as recited in claim 17, wherein said transverse passage is located adjacent a head portion and a threaded section.

* * * * *